C. McN. FROST.
RANGE FINDER.
APPLICATION FILED JULY 23, 1915.
1,196,771.
Patented Sept. 5, 1916.
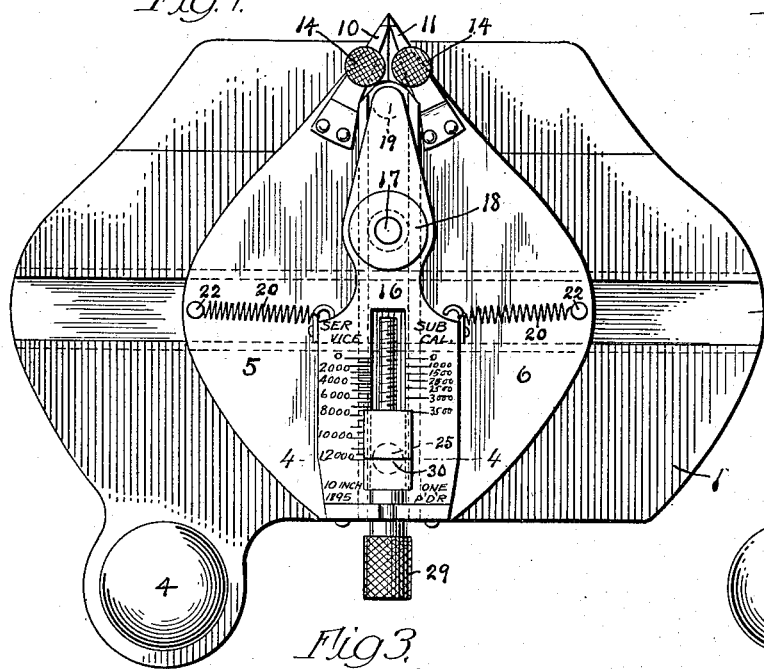
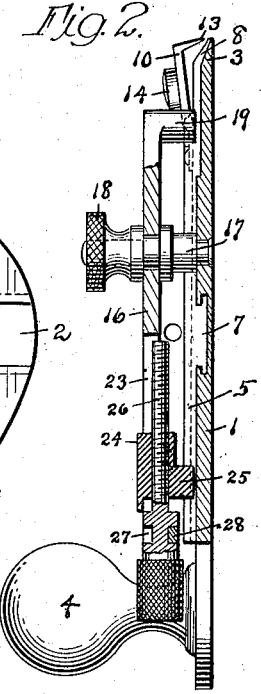
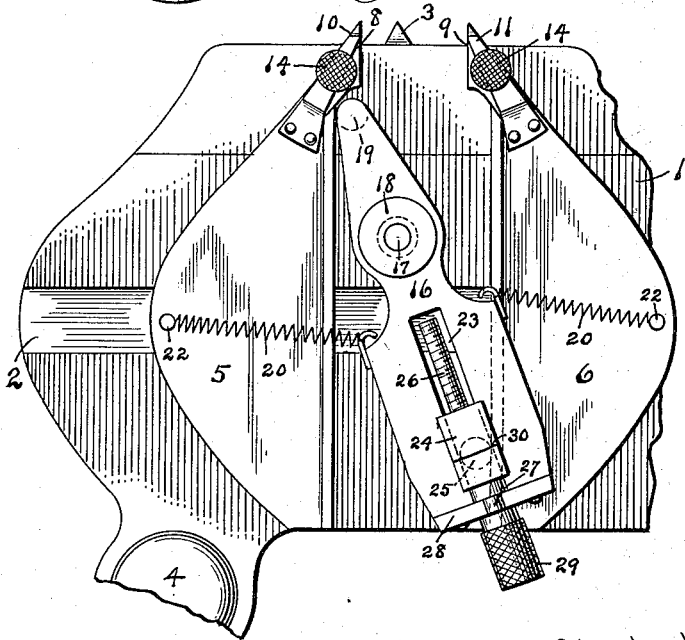
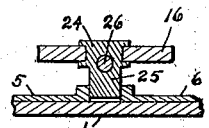
Witness
E. R. Barrett
Inventor
Charles McNaughton Frost
By Pagelsen and Spencer
Attorney

UNITED STATES PATENT OFFICE.

CHARLES McNAUGHTON FROST, OF SAN DIEGO, CALIFORNIA.

RANGE-FINDER.

1,196,771.   Specification of Letters Patent.   Patented Sept. 5, 1916.

Application filed July 23, 1915. Serial No. 41,503.

*To all whom it may concern:*

Be it known that I, CHARLES McNAUGHTON FROST, a citizen of the United States, residing at San Diego, in the county of San Diego and State of California, have invented a new and useful Range-Finder, of which the following is a specification.

This invention relates to means for mechanically predetermining on a plotting board the indicated coincident positions of a moving target and a projectile, and its object is to enable the plotter to locate this position in the shortest possible period of time.

This invention consists, in combination with a base, a series of pointers movable relative to each other in a straight line, and an adjusting device for separating the pointers consisting of a member pivoted intermediate its ends, a projection thereon on one side of the pivot for moving one of the pointers away from the second pointer, an adjustable contact on said member on the other side of the pivot for moving the third pointer from the second, and means for shifting said projection.

In the accompanying drawing, Figure 1 is a plan and Fig. 2 is a central vertical section of this improved range finder. Fig. 3 is a plan of the range finder with the pointers in operable position. Fig. 4 is a section on the line 4—4 of Fig. 1.

Similar reference characters refer to like parts throughout the several views.

In coast artillery work, to which this instrument is peculiarly adapted, the area protected by any particular gun may be shown on a plotting board whereon the distances are represented on any desired scale. Straight edges may be pivoted at proper points representing observing stations, and each will be furnished with a special protractor or azimuth circle so that the location of the moving target can be accurately plotted at each observation. As these observations are taken at definite time intervals, usually of half a minute, and immediately plotted, the speed and course of the target is determined with great accuracy. At a third point on the plotting board, representing a gun position, may be mounted a graduated straight edge and special protractor or azimuth circle by means of which the range and azimuth or direction of the target relative to the gun position may be measured. While the location and therefore range and azimuth of the target at each observation are thus determined, and after several observations the location, range and azimuth of the target at the next observation time can be accurately predicted, the determination of the range and azimuth of the target at the instant a shell fired from the gun at an observation time should reach the target, presents a more serious problem, for if a series of dots eight-tenths of an inch apart on a board, whose scale is three hundred yards per inch, represents the locations of a target at half minute intervals, the target is moving about 16.36 miles per hour. If the target is 10,000 yards distant, a projectile having an average speed of 1750 feet per second would require over seventeen seconds to travel to the target, at which time the target will have moved more than 125 yards from the location predicted for the time of firing. The distance A of this "set-forward" point from the last observed location is therefore about $$\left(1 + \frac{a}{30}\right)B,$$

$a$ being the time of flight of the projectile and B the distance between previous locations on the plotting board. The instrument shown in the drawing is designed to establish this "set-forward" point quickly and accurately.

The base 1 of the instrument is a thin plate of metal formed with a transverse groove 2, preferably T-shaped, and with a pointer 3 extending from the center of the upper edge. A knob 4 at the lower left hand corner permits the instrument to be readily positioned on the plotting board. Transversely slidable on the base are two plates 5 and 6 provided with transverse ribs 7 that accurately fit the groove 2, and are at right angles to the inner edges of these plates. Each of the plates may have a pointer 8—9 or a stylus 10—11, or both. Each stylus is preferably of spring steel with a sharp point 13 and a knob 14 whereby the point of the stylus can be readily forced into the paper of the plotting board.

The actuating member 16 is mounted on the bolt or pin 17, and is preferably held in position by a nut 18. At its front end is a depending cylindrical lug 19 extending down between the adjacent edges of the plates 5 and 6. Small coil springs 20 connect to this member 16 and to pins 22 on the plates and tend to normally hold the parts in the position shown in Fig. 1. This operating member 16 is formed with a slot 23, in which is slidable a nut 24 having a depending cylindrical lug 25, which also extends between the plates 5 and 6. It is desirable that the lugs 19 and 25 shall be of the same diameter and be in alinement with the pin 17 and the slot 23. A screw 26 is mounted in this nut and is formed with a circumferential groove 27 into which the yoke 28 extends. This yoke is secured across the outer end of the slot 23 and acts as a thrust bearing for the screw. Any other desired means may be employed for adjusting the lug 25 in the plane of the lug 19 and pin 17. This screw may have a knob 29 at its outer end so that it can be turned. The top of the member 16 may be graduated, as shown in Fig. 1, so that the cross mark 30 on the nut 24 and therefore the lug 25, may be properly positioned. The distance from the line 0 on the member 16 to the pin 17 is the same as the distance from this pin to the center of the lug 19. When the cross mark 30 is at 0, and the member 16 is swung, the pointers 8 and 9 will be moved equal distances from the pointer 3. If now the target spoken of before were at the gun position, the time of flight would be 0, and the "set-forward" point would be at the "predicted point". If the target were 12,000 yards distant at the last observation and moving toward the right, the screw is turned until the line 30 is at the 12000 mark. The point 3 is then placed on the last determined location of the target on the plotting board and the member 16 is swung and the base 1 is turned until the pointer 8 or stylus 10 is at the next previous location of the target. The stylus 11 is then depressed and its point 13 will indicate the "set-forward" point, that is the location of the target at the time a shell fired at the next observation time at the proper range and azimuth reaches this "set-forward" point.

It must be understood that each of these range finders must be graduated for the particular gun whose firing is to be controlled, for the time of flight will depend upon the muzzle velocity and upon the trajectory and weight of the projectile. As previously stated, the distance between the set over point and the last observed location will be $$\left(1+\frac{a}{30}\right)B.$$

When the pointer 8 is moved a distance B to the left, the pointer 9 must be moved a distance $$\left(1+\frac{a}{30}\right)B$$

to the right. The distance between the pin 17 and the line indicating 12,000 yards will therefore be $$\left(1+\frac{a}{30}\right)$$

times the distance between the pin 17 and the lug 19. If the time of flight of the projectile of a ten-inch gun of 1895 model for 12,000 yards is $22\frac{1}{2}$ seconds, then the distance from the pin 17 to the line marked 12,000 will be 1.75 the distance between this pin and the lug 19, and when swung as shown in Fig. 3, the member 16 will move the pointer 9 three-fourths farther than the pointer 8. The time of flight for each range for each gun must be fully determined in advance and the graduations on the member 16 can then be accurately established by simple calculations. It is evident that graduations may be placed at both sides of the slot 23 so that the instrument may be used for different guns. The points 3, 8, 9 and 13 should be sharp so as to interfere with each other as little as possible. The size of the instrument will depend upon the scale of the plotting board and must be such that the pointers 8 and 9 may be moved far enough to indicate the "set-forward" point for the swiftest vessels at the longest range of the gun with which the instrument is to be used.

I claim:—

1. In a range finder, the combination of a base having a pointer, a pair of plates slidably mounted thereon and each having a pointer, an operating member pivotally mounted intermediate its ends on the base and provided with two lugs engaging said plates, and means for adjusting one of the lugs.

2. In a range finder, the combination of a base having a pointer, a pair of plates mounted on the base and each having a pointer normally adjacent the pointer on the base, said plates being slidable on the base in such a manner that the pointers remain in substantially the same straight line, an operating member pivotally mounted on the plate and provided with two lugs engaging said plates, one of the lugs being adjustable in a plane passing through the pivot and the other lug, and means for adjusting said lug.

3. In a range finder, the combination of a base having a pointer, a pair of plates slidably mounted thereon and each having a pointer, a pivot between the plates, an operating member mounted intermediate its ends on the pivot and having a cylindrical lug at one end extending down between said plates and having a slot in the other end, a lug slidable in said slot and extending down between the plates, and means for moving said adjustable lug.

4. In a range finder, the combination of a base having a pointer, a pair of plates slidably mounted thereon and each having a pointer, a pivot between the plates, an operating member mounted intermediate its ends on the pivot and having a cylindrical lug at one end extending down between said plates and also having a longitudinal slot in the other end, a nut slidable in the slot, a screw to move the nut, and a cylindrical lug extending from the nut between said plates.

5. In a range finder, the combination of a base having a pointer fixed thereto, a pair of laterally movable pointers mounted on the base, adjustable means for positioning said movable pointers relative to the pointer on the base, and a scale graduated for different ranges to determine the adjustment of the pointer positioning means.

6. In a range finder, the combination of a stationary pointer and two movable pointers, means to support the pointers, one of the movable pointers and the stationary pointer constituting a measuring device and the other movable pointer and the stationary pointer constituting a predicting device, operating members for said devices of which the operating member for the predicting device is adjustable, and a scale bar graduated for ranges to govern the operating member for the predicting device.

7. In a range finder, the combination of a base, a fixed pointer and two movable pointers mounted on the base, means to position one of the movable pointers relative to the stationary pointer to indicate the distance traveled by a moving target between regular periods of observation, and adjustable means to position the other movable pointer relative to the stationary pointer to indicate the distance the moving target will have traveled by the time it is reached by a projectile fired at the next period of observation, the distances being represented by $$A = \left(1 + \frac{a}{c}\right)B$$

where A is the distance indicated by the second movable pointer, B the distance indicated by the first movable pointer, $a$ the time of flight of the projectile and $c$ the time interval between observations.

8. In a range finder, the combination of a base, a pair of movable devices mounted on the base, one to indicate the distance traveled by a moving target between the last two regular periods of observation and the second to indicate the distance the target will have traveled by the time it is reached by a projectile fired at the next period of observation, a lever pivoted intermediate its ends, one arm of the lever engaging the first movable device and being of constant length, the other arm engaging the second movable device and being of variable length, its length being $$\left(1 + \frac{a}{c}\right)$$

times the length of the other arm where $a$ represents the time of flight of the projectile to the target and $c$ the time interval between observations.

9. In a range finder, the combination of a base, a pair of movable devices mounted on the base, one to indicate the distance traveled by a moving target between the last two regular periods of observation and the second to indicate the distance the target will have traveled by the time it is reached by a projectile fired at the next period of observation, a lever pivoted intermediate its ends, one arm of the lever engaging the first movable device and being of constant length, the other arm engaging the second movable device and being of variable length, its length being $$\left(1 + \frac{a}{c}\right)$$

times the length of the other arm where $a$ represents the time of flight of the projectile to the target and $c$ the time interval between observations, said lever being graduated for different ranges.

10. In a range finder adapted to be used with a plotting board upon which locations of moving targets at predetermined intervals of time may be indicated, a supporting device and an indicator adapted to be positioned on said plotting board by the plotted location of the target at the last observation, a second and a third indicator mounted on the support and movable relative to the first, and operating means mounted adjacent said indicators and having two engaging portions adapted to contact with said second and third indicators, one of said engaging portions being adjustable on the operating member so that the relative movements of said second and third indicators may be varied so that when either the second or third indicator is positioned for the next to the last plotted position of the target, the other will locate the probable position of the target at the expiration of a period of time equal to the next predetermined interval of time plus the time of flight of a projectile fired at the end of such interval at the moving target, the adjustment of said movable engaging portion of the actuating member being determined by the speed of the projectile and the range of the target at the last observed location.

11. In a range finder adapted to be used with a plotting board upon which locations of moving targets at predetermined intervals of time may be indicated, the combination of a support, an indicator on the support adapted to be positioned on said plotting board by the plotted location of the target at the last observation, a second and a third indicator on the support movable relative to the first, and operating means for actuating the second and third indicators and comprising means whereby the relative movement of the third indicator in respect to the second may be varied.

In testimony whereof I have signed this specification.

CHARLES McNAUGHTON FROST.

Copies of this patent may be obtained for five cents each, by addressing the "Commissioner of Patents, Washington, D. C."